(12) United States Patent
Newman et al.

(10) Patent No.: US 8,611,600 B2
(45) Date of Patent: Dec. 17, 2013

(54) THREE-FRAME DIFFERENCE MOVING TARGET ACQUISITION SYSTEM AND METHOD FOR TARGET TRACK IDENTIFICATION

(75) Inventors: Arthur M. Newman, Sherman Oaks, CA (US); Vitaliy M. Kaganovich, Los Angeles, CA (US); Nicholas Sun, Cerritos, CA (US); Dave S. Douglas, Marina Del Ray, CA (US)

(73) Assignee: Raytheon Company, Waltham, MA (US)

( * ) Notice: Subject to any disclaimer, the term of this patent is extended or adjusted under 35 U.S.C. 154(b) by 125 days.

(21) Appl. No.: 13/271,700

(22) Filed: Oct. 12, 2011

(65) Prior Publication Data

US 2013/0094694 A1    Apr. 18, 2013

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .......... 382/103, 107, 236; 348/152, 154, 155, 348/169, 170, 171, 172, 208.14, 208.16, 348/352, 353, 356, 465, 558, 208.1, 208.2; 715/250, 862
See application file for complete search history.

(56) References Cited

U.S. PATENT DOCUMENTS

| | | | |
|---|---|---|---|
| 5,150,426 A * | 9/1992 | Banh et al. ..................... | 382/103 |
| 5,960,097 A * | 9/1999 | Pfeiffer et al. ................ | 382/103 |
| 7,483,551 B2 * | 1/2009 | Chen ............................. | 382/107 |
| 7,933,464 B2 * | 4/2011 | Zhang et al. .................. | 382/255 |

OTHER PUBLICATIONS

"Israel Application Serial No. 218825, Voluntary Amendment filed Jul. 3, 2012", 7 pgs.

* cited by examiner

*Primary Examiner* — Abolfazl Tabatabai
(74) *Attorney, Agent, or Firm* — Schwegman, Lundberg & Woessner (57) ABSTRACT

Embodiments of a target-tracking system and method of determining an initial target track in a high-clutter environment are generally described herein. The target-tracking system may register image information of first and second warped images with image information of a reference image. Pixels of the warped images may be offset based on the outputs of the registration to align each warped images with the reference image. A three-frame difference calculation may be performed on the offset images and the reference image to generate a three-frame difference output image. Clutter suppression may be performed on the three-frame difference image to generate a clutter-suppressed output image for use in target-track identification. The clutter suppression may include performing a gradient operation on a background image to remove any gradient objects.

20 Claims, 7 Drawing Sheets

THREE-FRAME DIFFERENCE OUTPUT IMAGE

THREE-FRAME DIFFERENCE MOVING TARGET ACQUISITION SYSTEM AND METHOD FOR TARGET TRACK IDENTIFICATION

GOVERNMENT RIGHTS

This invention was not made with United States Government support. The United States Government does not have certain rights in this invention.

TECHNICAL FIELD

Embodiments pertain to systems and methods for acquiring and tracking moving targets. Some embodiments pertain to video tracking systems. Some embodiments pertain to target trackers for identifying a target track of a moving target. Some embodiments pertain to imaging systems.

BACKGROUND

Video tracking systems may be used to locate a moving object over time using a camera or other imaging device. These systems have a variety of uses that include human-computer interaction, security and surveillance, video communication and compression, augmented reality, traffic control, medical imaging and video editing. Video tracking can be processing intensive due to the amount of data that is contained in video. Adding further to the complexity of video tracking is the possible need to use object recognition techniques for tracking.

Many conventional tracking systems identify moving targets by subtracting current frames of video from background estimates. One (problem with these conventional tracking systems is that the background estimates may take many frames to compute and may be corrupted by the motion of the target. Another problem with these conventional tracking systems is that they are not suitable for moving platforms because parallax-induced motion affects the background estimate.

Thus, there are general needs for improved target-tracking systems and methods for tracking targets. There are also general needs for target-tracking systems and methods for tracking targets that are less computationally expensive. There are also general needs for target-tracking systems and methods for tracking targets that are suitable for use on moving platforms.

SUMMARY

A target-tracking system and method for acquiring a moving target and determining an initial target track suitable for use in a high-clutter environment are generally described herein. The system may register image information of first and second warped images with image information of a reference image. Pixels of the warped images may be offset based on the outputs of the registration to align the warped images with the reference image. A three-frame difference calculation may be performed on the offset images and the reference image to generate a three-frame difference output image. Clutter suppression may be performed on the three-frame difference image to generate a clutter-suppressed output image for use in moving target acquisition. The clutter suppression may include performing a gradient operation on a background image and dividing the three-frame difference output image by the gradient to remove residuals.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
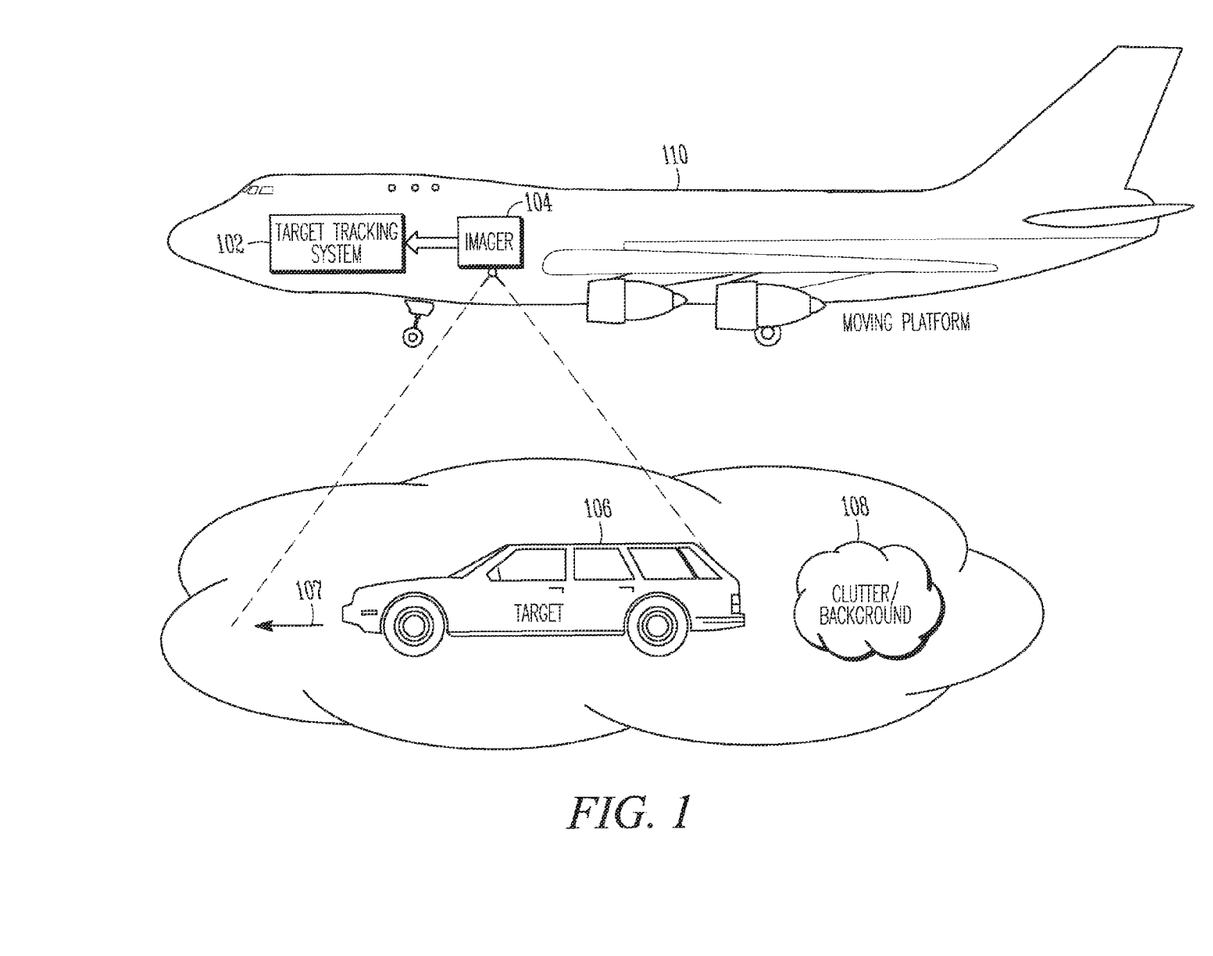
FIG. 1 illustrates an operational environment of a target-tracking system in accordance with some embodiments.

FIG. 1 illustrates an operational environment of a target-tracking system in accordance with some embodiments. Operational environment 100 includes a moving platform 110, which may include a target-tracking system 102 and imager 104 configured for tracking a moving target 106 and identifying a target track 107. The target-tracking system 102 may be suitable for identifying and tracking the moving target 106 in an environment with high-clutter 108.

In accordance with embodiments, the imager 104 may provide video frames to the target-tracking system 102. The target-tracking system 102 may be configured to process the video frames and generate a clutter-suppressed output image for subsequent image processing for use in moving target acquisition and target tracking. In these embodiments, the target-tracking system 102 may be configured to register image information of first and second warped images with image information of a reference image, and offset pixels of the warped images based on the outputs of the registration to align the warped images with the reference image. The target-tracking system 102 may perform a three-frame difference calculation on both the offset images and the reference image to generate a three-frame difference output image. Clutter suppression may be performed on the three-frame difference image to generate the clutter-suppressed output image for use in moving target acquisition and target tracking. The target-tracking system 102 may also be used to identify a target track 107. The use of three frames may be sufficient to segment a moving target without the need to perform a background estimate. The three-frame difference calculation may locate and remove any misregistration and any parallax induced clutter. These embodiments are discussed in more detail below.

Unlike conventional systems, computationally expensive background estimates are not needed and the target-tracking system 102 may be suitable for use on a moving platform 110, although this is not a requirement as the target-tracking system 102 is equally suitable for use on a non-moving platform. The moving platform 110 my be an aerial sensor such as aircraft including an unmanned aerial vehicle (UAV), although the scope of the embodiments is not limited in this respect. The target-tracking system 102 may also be suitable for use on wide-area sensors.

Figure 2:
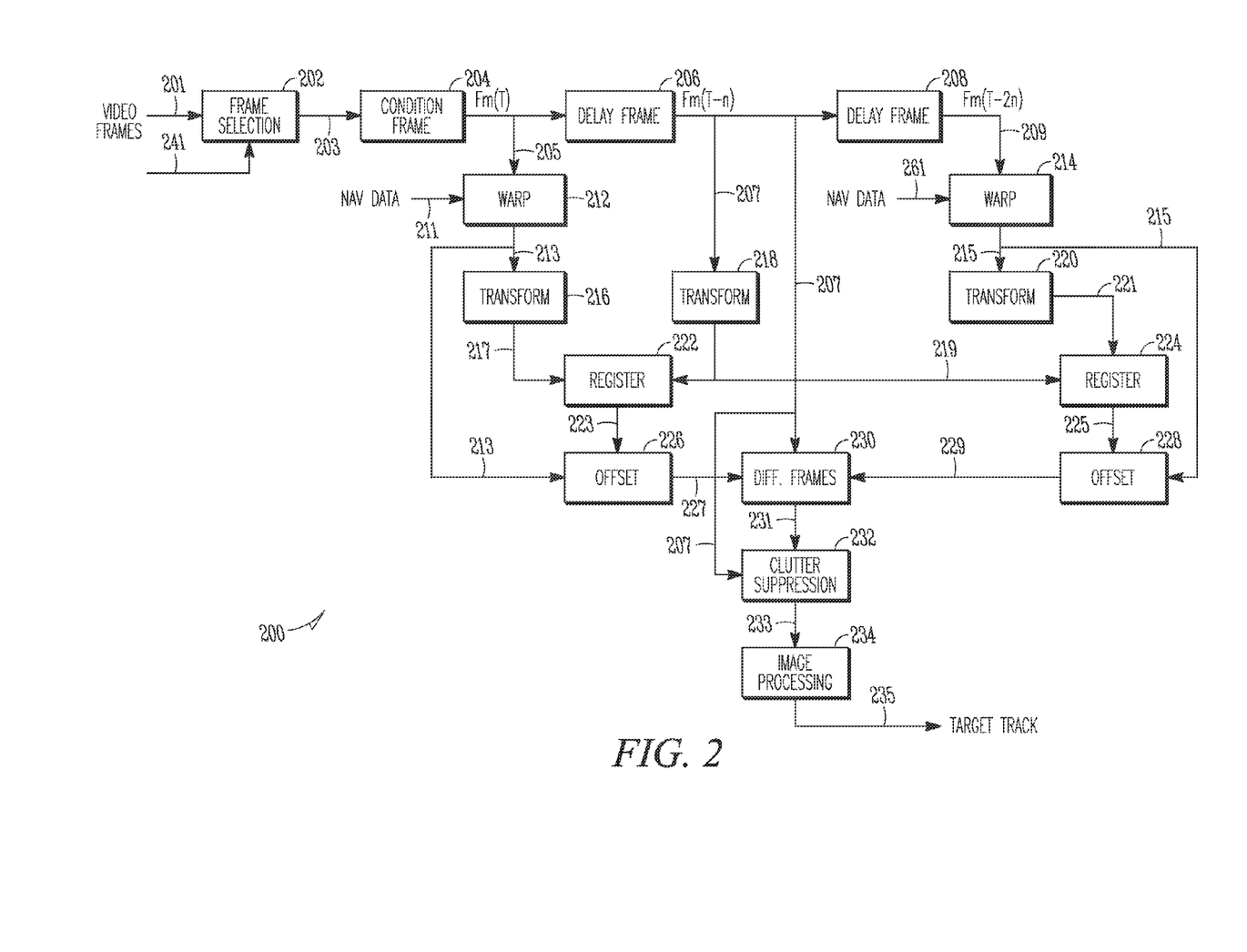
FIG. 2 is a block diagram of a three-frame difference moving target-tracking system in accordance with some embodiments.

FIG. 2 is a block diagram of a three-frame difference moving target-tracking system in accordance with some embodiments. Three-frame difference moving target-tracking system 200 may be suitable for use as target-tracking system 102 (FIG. 1), although other configurations may also be suitable.

The three-frame difference moving target-tracking system 200 may be configured to receive frames of a video stream 201 from an imager, such as imager 104 (FIG. 1), receive navigation data 211 and 261 and frame-timing and target information 241 from the imager 104 and from a platform, such as moving platform 110 (FIG. 1). The target-tracking system 200 may be configured to generate a clutter-suppressed output image 233 which may be subsequently processed to identify a target track and to track a target, such as target 106 (FIG. 1). These embodiments are described in more detail below.

In some embodiments, the three-frame difference moving target-tracking system 200 may include a frame-selection element 202 to select frames from the video stream 201, a condition element 204 to condition the selected frames 203 and delay elements 206 and 208 to delay the selected frames 203. The target-tracking system 200 may also include warping elements 210 and 212 to generate first and second warped images 213 and 215, respectively, and transform elements 216, 218 and 220 to operate and the selected frames 203 as described below.

The three-frame difference moving target-tracking system 200 may also include a first registration element 222 to align image information 217 of a first warped image 213 with image information 219 of a reference frame 207 and a second registration element 224 to align image information 221 of a second warped image 215 with the image information 219 of the reference frame 207. Image information 217 may be generated by transform element 216 and image information 221 may be generated by transform element 220.

The target-tracking system 200 may also include a first offset element 226 to offset pixels of the first warped image 213 based on the output 223 of the first registration element 222 to align the pixels with corresponding pixels of the reference frame 207 to generate a first offset image 227. The target-tracking system 200 may also include a second offset element 228 to offset the pixels of the second warped image 215 based on the output 225 of the second registration 224 to align the pixels with corresponding pixels of the reference frame 207 to generate a second offset image 229.

Figure 4:
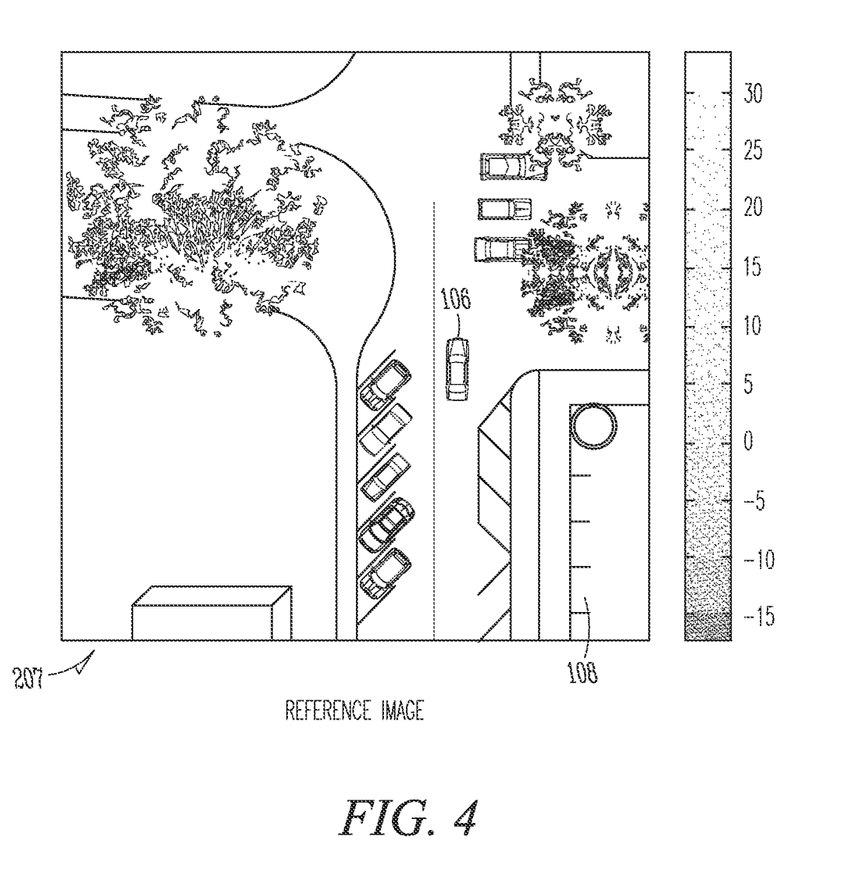
FIG. 4 is a sketch of a reference image in accordance with some embodiments.
Figure 5:
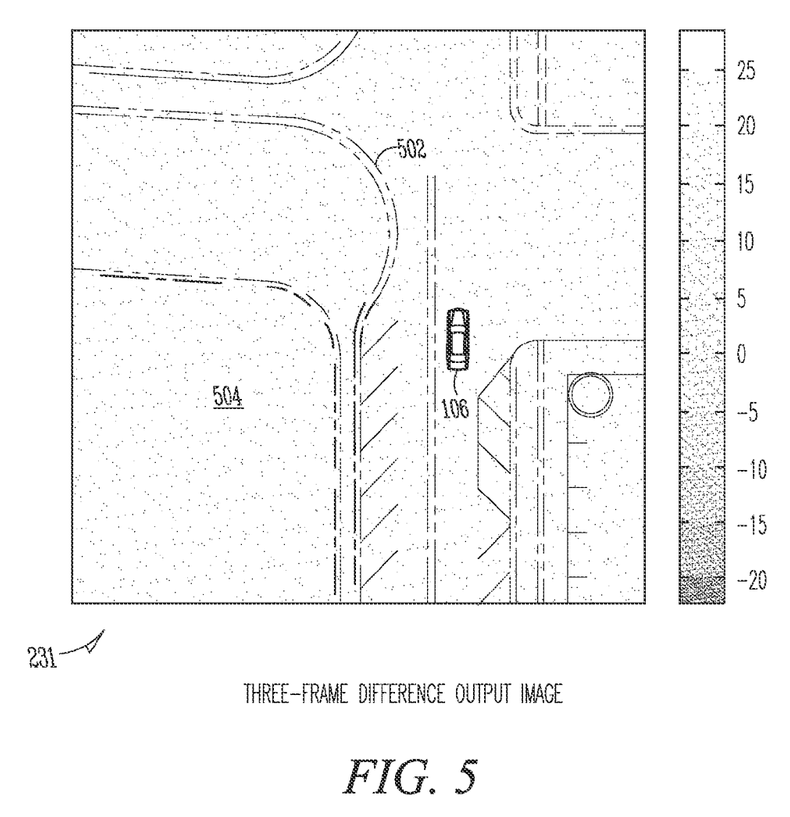
FIG. 5 is a sketch of a three-frame difference output image in accordance with some embodiments.

The three-frame difference moving target-tracking system 200 may also include a three-frame difference calculation element 230 to perform a pixel-by-pixel three-frame difference calculation (see FIG. 3) on the first offset image 227, the second offset image 229 and the reference frame 207 (see FIG. 4) to generate a three-frame difference output image 231 (see FIG. 5). The three-frame difference moving target-tracking system 200 may also include a clutter suppression element 232 to perform clutter suppression on the three-frame difference image 231 to generate the clutter-suppressed output image 233 (see FIG. 6) for use in identification of the target track 107.

In some embodiments, the three-frame difference moving target-tracking system 200 may also include an image-processing element 234. The image-processing element 234 may be configured to perform image processing on the clutter-suppressed output image 233. A target-track output 235, for example, may be provided by image-processing element 234.

Figure 3:
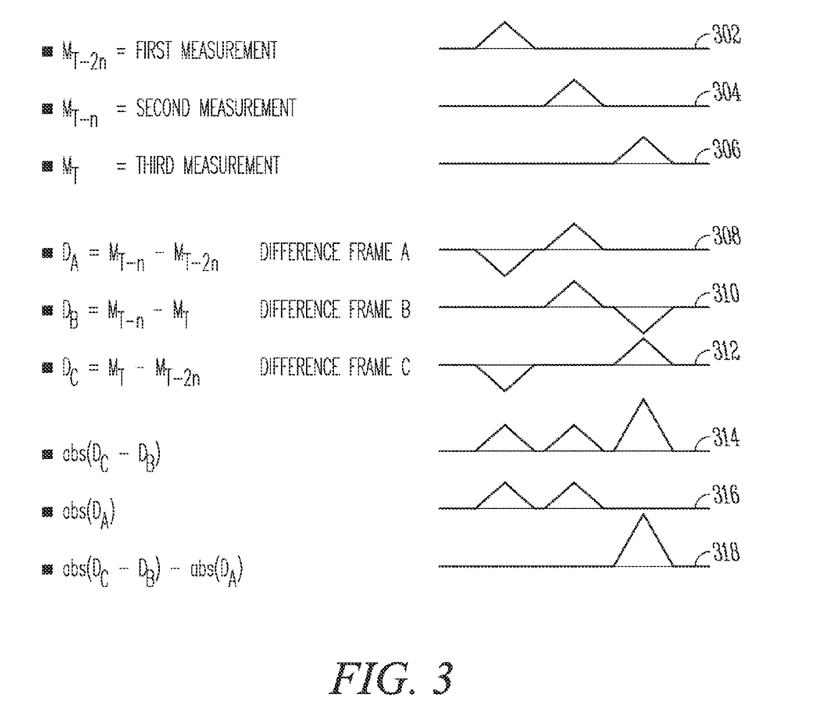
FIG. 3 illustrates an example three-frame difference calculation in accordance with some embodiments.

FIG. 3 illustrates an example three-frame difference calculation in accordance with some embodiments. The three-frame difference calculation may comprise generating each pixel of the three-frame difference output image 231 based on the following equation:

$$[abs(D_C-D_B)-abs(D_A)]/2*sign(D_C).$$

In the above equation, $D_A$ is a difference between corresponding pixels in the reference frame 207 and the second offset image 229, $D_B$ is a difference between corresponding pixels in the reference frame 207 and the first offset image 227, and $D_C$ is a difference between corresponding pixels in the first offset image 227 and the second offset image 229. In these embodiments, the above equation may be calculated for each pixel of the image. In these embodiments, the above equation may be used to recover moving objects at time T.

In the example illustrated in FIG. 3, a moving object is illustrated at three different times, time $M_{T-2n}$, time $M_{T-n}$ and time $M_T$. In this example, $D_A=M_{T-n}-M_{T-2n}$; $D_B=M_{T-n}-M_T$; $D_C=M_T-M_{T-2n}$. Deflections in lines 302, 304 and 306 illustrated in FIG. 3 correspond to a location of a moving target in a row of pixels of the image. Deflections in lines 308, 310 and 312 illustrate the differences $D_A$, $D_B$ and $D_C$. Deflections in lines 314, 316 and 318 illustrate the portions of the above equation shown on the left, which are used to compute the three-frame difference output image 231 on a pixel-by-pixel basis.

In other embodiments, the frame arithmetic to recover moving objects at time $T_{-n}$ may be based on the following equation:

$$[abs(D_A+D_B)-abs(D_C)]/2*sign(D_A).$$

The frame arithmetic to recover the moving objects at time $T_{-2n}$ may be based on the following equation:

$$[abs(D_A+D_C)-abs(D_B)]/2*sign(D_A)).$$

This pixel-by-pixel three-frame difference calculation performed by the three-frame difference calculation element 230 may be performed on the first offset image 227, the second offset image 229 and the reference frame 207 to generate the three-frame difference output image 231.

FIG. 4 is a sketch of a reference frame 207 in accordance with some embodiments. Reference frame 207 includes moving target 106 in an environment shown with high clutter 108. The target-tracking system 102 may be configured to acquire the moving target 106 and identify a target track based on frames of the reference frame 207 as described herein. Reference frame 207 may be provided by delay element 206 (FIG. 2).

FIG. 5 is a sketch of a three-frame difference output image 231 in accordance with some embodiments. Three-frame difference output image 231 shows the moving target 106 of the reference frame 207 (FIG. 4). Although most of the clutter and background have been removed, gradient objects 502 within the background 504 may remain. Gradient objects 502 are the residual that results from registration errors and parallax-induced misalignment. Gradient objects 502 may be considered 'clutter leakage'.

Three-frame difference output image 231 may be generated by the three-frame difference calculation element 230 (FIG. 2). The clutter suppression element 232 (FIG. 2) may be configured to perform clutter suppression on the three-frame difference image 231 to generate the clutter-suppressed output image 233 for subsequent use in target tracking and identification of the target track 107.

Figure 6:
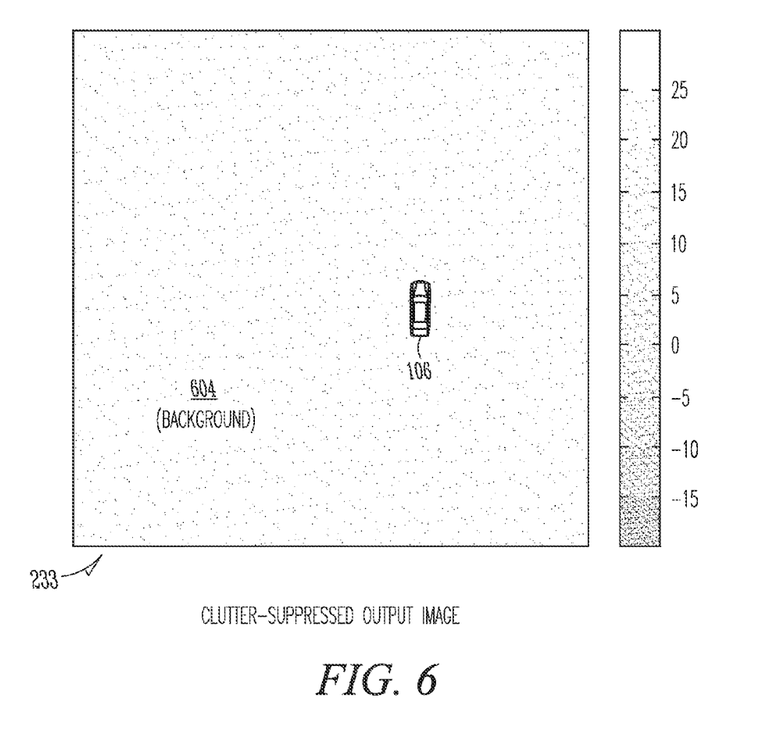
FIG. 6 is a sketch of a clutter-suppressed output image in accordance with some embodiments.

FIG. 6 is a sketch of a clutter-suppressed output image 233 in accordance with some embodiments. The clutter-suppressed output image 233 shows the moving target 106 of the three-frame difference output image 231 (FIG. 5) however the gradient objects 502 (FIG. 5) have been removed from the background 604.

The clutter suppression element 232 (FIG. 2) may be configured to calculate the image background 504 (FIG. 5) of the three-frame difference output image 231 (FIG. 5) by subtracting, on a pixel-by-pixel basis, the three-frame difference output image 231 from the reference frame 207 to remove moving objects and generate a background image. The background image would correspond to image 231 without moving objects (e.g., the moving target 106). The clutter suppression element 232 may perform a gradient operation on this background image to calculate a gradient of the background image and may divide the three-frame difference output image 231 by the gradient to generate the clutter-suppressed output image 233 shown in FIG. 6. In these embodiments, the gradient operator may identify any gradient objects 502 that may result from translation error in the warping and registration processes. The clutter-suppressed output image 233 shown in FIG. 6 has gradient objects removed from the background 604 leaving only the moving target 106. Any other moving objects in the reference frame 207 (FIG. 4) may also remain.

The image-processing element 234 (FIG. 2) may be configured to perform image processing on the clutter-suppressed output image 233 to segment the pixels of the background 604 from non-background pixels to detect the moving target 106 in the image 233. The target track 107 (FIG. 1) as well as determine an initial target location may also be determined. A target-track output 235 (FIG. 2) may be provided by image-processing element 234.

Referring back to FIG. 2, in some embodiments, the delay elements 206 and 208 may each be configured to delay a first frame by a predetermined frame delay time (T). The first frame may be a first frame of the selected group of frames 203 and may be considered a twice-delayed frame 209 (having a delay of 2T). Delay element 206 may be configured to delay a second frame by the predetermined frame delay time T. The second frame may also be selected from the selected group of frames 203 and may be used as the reference frame 207. The warp element 212 may be configured to warp, based on the navigation data 211, a third frame 205 of the selected group of frames 203 to generate the first warped image 213. The third frame 205 may have no delay with respect to the twice-delayed frame 209 and the reference frame 207. Warp element 214 may be configured to warp, based on the navigation data 261, the twice-delayed frame 209 to generate the second warped image 215. The frame delay time (T) may range from as little as the time of one frame to up to several seconds, depending on the navigation data and the frame timing and target information. The frame delay time may be determined based on the speed and size of the target 106. For fast moving targets, shorter frame delay times may be used. Longer frame delays may be determined by the length of time the moving object takes to vacate the region it occupied during the previous selected frame (i.e., to get out of its own way). In other words, the frame delay time may be selected so that the target 106 does not overlap with itself in adjacent selected frames. In an example, embodiment, for a small car travelling at 2.5 miles per hour, the frame delay time may be roughly 2.5 seconds.

In these embodiments, warping the third frame 205 may align non-moving objects in the image of frame 205 so that they occupy the same positions as they do in the reference frame 207. Likewise, warping the twice-delayed frame 209 may align the non-moving objects in the image of frame 209 so that they occupy the same positions as they do in the reference frame 207. The twice-delayed frame 209 may delayed by T−2n with respect to the third frame 205 and the reference frame 207 may be delayed by T−n with respect to the third frame 205. The use of the navigation data 211 and 261 allows the images of frames 205 and 209 to be aligned with the reference frame.

In some embodiments, the navigation data 211, 261 comprises first and second navigation data streams that include position information of the imager 104 (FIG. 1), directional information of the imager 104 (i.e., a direction the imager 104 is pointed), and velocity information of the imager 104 (i.e., when the imager 104 is moving). In these embodiments, the navigation data 211, 261 may take into account the movement of the moving platform 110 (FIG. 1). The navigation data 211, 261 my describe the position and altitude of the platform 110, which may correspond to the position of the imager 104. The navigation data 211, 261 may also describe where the imager 104 is pointed in embodiments in which the imager 104 is configured to swivel. The navigation data 211, 261 may also describe additional imager-related information for use by warp elements 212 and 214 to calculate an image-warp so that will get the images of frames 205 and 209 will overlay with the reference frame 207. The additional imager-related information may include specs that may change in real time, such as focal length (e.g., zoom), the wavelengths that the imager 104 is recording (B&W, color or infrared (IR)), etc. As a result, the warping elements 212 and 214 may perform dynamic and real-time image warping.

In some embodiments, a one-to-one correspondence between the navigation data 211, 261 and the frames 205, 209 may be provided, while in other embodiments, the navigation data 211, 261 and the frames 205, 209 may be recorded at different rates. When the navigation data 211, 261 is recorded at different rates, the navigation data 211, 261 may be interpolated to correspond to the time when a corresponding frame was captured. In fixed-imager embodiments (e.g., parking lot surveillance situations), the navigation data may be fixed and navigation data 211 may be the same as navigation data 261.

In some embodiments, the transform element 216 may be configured to perform a transform on the first warped image 213 to generate spatial frequency domain image information 217 of the first warped image 213. Transform element 220 may be configured to perform a transform 220 on the second warped image 215 to generate spatial frequency domain image information 221 of the second warped image 215. Transform element 218 may be configured to perform a transform on the reference frame 207 to generate spatial frequency domain image information 219 of the reference frame 207.

In some embodiments, the transform elements 216, 218 and 220 may be configured to perform discrete Fourier transforms such as fast-Fourier transforms (FFTs). In these embodiments, performing an FFT on the first warped image 213 may generate the spatial frequency domain image information 217 of the first warped image 213, performing an FFT on the second warped image 215 my generate the spatial frequency domain image information 221 of the second warped image 215, and performing an FFT on the reference image (of reference frame 207) may generate the spatial frequency domain image information 219 of the reference frame 207. In some embodiments, the FFTs are performed concurrently on the three images 213, 207 and 215 (i.e., in parallel).

In some embodiments, the first registration element 222 may perform a first correlation to correlate the spatial frequency domain image information 217 of the first warped image 213 with the spatial frequency domain image information 219 of the reference frame 207. The second registration element 224 may perform a second correlation to correlate the spatial frequency domain image information 221 of the second warped image 215 with the spatial frequency domain image information 219 of the reference frame 207. In these embodiments, the pixels of the first warped image 213 may be offset by offset element 226 based on the output 223 of the first correlation to align the pixels with corresponding pixels of the reference frame 207 to generate the first offset image 227. Pixels of the second warped image 215 may be offset by offset element 228 based on the output 225 of the second correlation to align the pixels with corresponding pixels of the reference frame 207 to generate the second offset image 229. The correlations may help correct for errors in the navigation data and may remove translation error.

In some embodiments, the three-frame difference moving target-tracking system 200 may be configured to delay, warp, transform, register, offset, perform the three-frame difference calculation and perform clutter suppression for a next set of three frames for further use in target tracking and target track identification. In some of these embodiments, these operations are repeated in such a way that the reference frame 207 from a prior operation now becomes the twice-delayed frame 209 of a next set of operations, and the third frame 205 becomes the reference frame 207.

In some embodiments, frame-selection element 202 may be configured to select frames 202 from the video stream 201 based on the frame timing and target information 241. The frame timing and target information 241 may include a length of the moving target 106, a minimum velocity of the target 106, and frame-timing information of frames of the video stream 201.

In some embodiments, the frame-selection element 202 may select every frame of the video stream. In other embodiments, every $n^{th}$ frame of the video stream 201 may be selected in which n may range from two to up to one-hundred or more. For example, every third frame may be selected in some embodiments, while in other embodiments, every tenth or hundredth frame of the video stream 201 may be selected depending on the size or length of the target 106, the velocity of the target 106 and the frame timing. In some embodiments, the selected frames 203 may be conditioned by the frame condition element 204 to remove or reduce noise, correct for corrupted pixels and correct for brightness, among other things. In some embodiments, aground sample distance may also be used to determine the amount of ground that each pixel represents for use in determining how often frames are selected by the frame-selection element 202.

Although target-tracking system 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of the target-tracking system 200 may refer to one or more processes operating on one or more processing elements.

Figure 7:
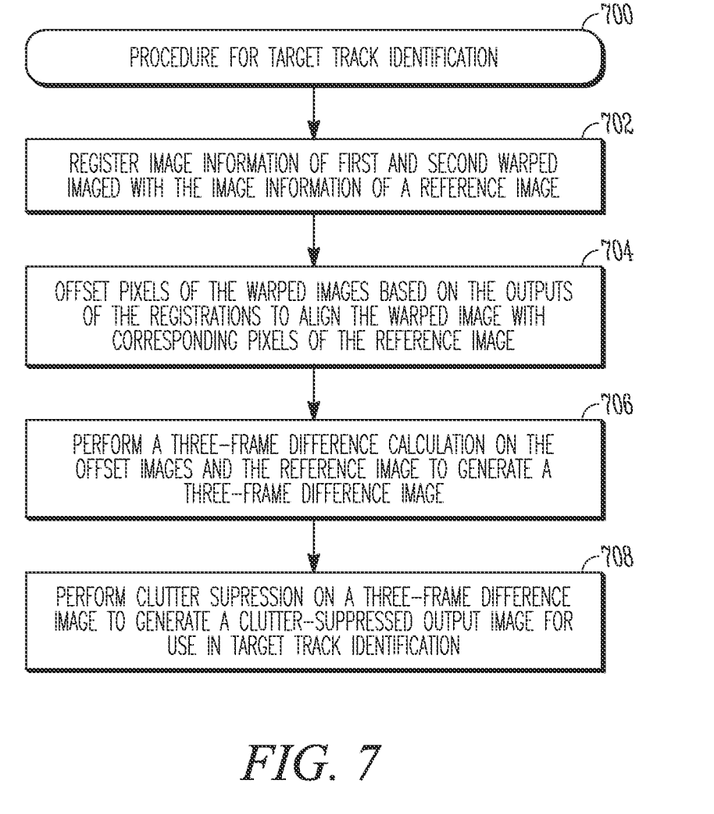
FIG. 7 is a procedure for target track identification in accordance with some embodiments.

FIG. 7 is a procedure for target track identification in accordance with some embodiments. Procedure 700 may be performed by a target-tracking system, such as target-tracking system 200 (FIG. 2) although other target-tracking systems may also be suitable.

Operation 702 comprises registering image information of first and second warped images with the image information of a reference image, such as reference image corresponding to reference frame 207 (shown in FIG. 4). Operation 702 may be performed by registration elements 222 and 224 (FIG. 2).

Operation 704 comprises offsetting pixels of the warped images based on the outputs of the registrations to align each warped image with corresponding pixels of the reference image. Operation 704 may be performed by offset elements 226 and 228 (FIG. 2).

Operation 706 comprises performing a three-frame difference calculation on the offset images and the reference image to generate a three-frame difference image. Operation 706 may be performed by three-frame difference calculation element 230 (FIG. 2) to generate three-frame difference output image 231 (FIG. 5).

Operation 708 comprises performing clutter suppression on the three-frame difference image 231 to generate a clutter-suppressed output image 233 (FIG. 6) for use in target track identification. Operation 708 may be performed by the clutter suppression element 232 (FIG. 2). Subsequent image processing may be performed on the clutter-suppressed output image for target tracking and target track identification.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the target-tracking system 200 may include one or more processors that may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A three-frame difference moving target-tracking system for target track identification for use on a moving platform, the system configured to:
    perform a three-frame difference calculation on a first offset image, a second offset image and a reference image to generate a three-frame difference output image; and
    perform clutter suppression on the three-frame difference image by dividing the three-frame difference output image by a background image gradient to generate a clutter-suppressed output image,
    wherein the reference frame is updated for each subsequent performance of the three-frame difference calculation.

2. A three-frame difference moving target-tracking system for target track identification, the system configured to:
    perform a three-frame difference calculation on a first offset image, a second offset image and a reference image to generate a three-frame difference output image;
    perform clutter suppression on the three-frame difference image to generate a clutter-suppressed output image;

perform a first registration to align image information of a first warped image with image information of the reference image;

perform a second registration to align image information of a second warped image with the image information of the reference image;

offset pixels of the first warped image based on the output of the first registration to align with corresponding pixels of the reference image to generate the first offset image; and offset pixels of the second warped image based on the output of the second registration to align with corresponding pixels of the reference image to generate the second offset image.

3. The system of claim 2 wherein to perform the clutter suppression, the system is configured to:

calculate image background by subtracting the three-frame difference output image from the reference image and generate a background image;

perform a gradient operation on the background image to calculate a gradient of the background image; and divide the three-frame difference output image by the gradient to generate the clutter-suppressed output image.

4. The system of claim 3 further configured to perform image processing on the clutter-suppressed output image to segment background pixels from non-background pixels to detect a moving target and identify a target track.

5. The system of claim 4 wherein the three-frame difference calculation comprises generating the three-frame difference output image based on the following equation:

$$[abs(D_C - D_B) - abs(D_A)]/2 * sign(D_C) \text{ wherein:}$$

$D_A$ is a difference between corresponding pixels in the reference image and the second offset image, $D_B$ is a difference between corresponding pixels in the reference image and the first offset image, and $D_C$ is a difference between corresponding pixels in the first offset image and the second offset image.

6. The system of claim 3 further configured to:

delay a first frame of a selected group of frames by twice a predetermined time to generate a twice-delayed frame;

delay a second frame of the selected group of frames by the predetermined time to generate the reference frame;

warp, based on navigation data, a third frame of the selected group of frames to generate the first warped image; and warp, based on navigation data, the twice-delayed frame to generate the second warped image.

7. The system of claim 6 wherein the frames are part of a sequence of frames generated by an imager, and wherein the navigation data, comprises first and second navigation data streams and includes position information of the imager, directional information of the imager, and velocity information of the imager, when the imager is moving.

8. The system of claim 7 further configured to:

perform a transform on the first warped image to generate spatial frequency domain image information of the first warped image;

perform a transform on the second warped image to generate spatial frequency domain image information of the second warped image; and perform a transform on the reference image to generate spatial frequency domain image information of the reference image, wherein the first registration is performed to align the spatial frequency domain image information of the first warped image with the spatial frequency domain image information of a reference image, and wherein the second registration is performed to align the spatial frequency domain image information of the second warped image with the spatial frequency domain image information of the reference image.

9. The system of claim 8 wherein the transforms comprise fast-Fourier transforms (FFTs), wherein the first registration comprises a first correlation that is performed to correlate the spatial frequency domain image information of the first warped image with the spatial frequency domain image information of the reference image, and wherein the second registration comprises performing a second correlation to correlate the spatial frequency domain image information of the second warped image with the spatial frequency domain image information of the reference image.

10. The system of claim 8 wherein the system is configured to delay, warp, transform, register, offset, perform a three-frame difference calculation and perform clutter suppression for a next set of three images for further use in target track identification.

11. The system of claim 8 wherein the system is further configured to:

select frames from a video stream generated from an imager based on frame-timing and target information, the target information including a length of a target, a velocity of the target, and wherein the imager is configured to be located on a moving platform.

12. A method of target acquisition for use on a moving platform comprising:

registering image information of first and second warped images with image information of a reference image;

offsetting pixels of the warped images based on the outputs of the registering to align the warped images with the reference image;

performing a three-frame difference calculation on the offset images and the reference image to generate a three-frame difference output image; and performing clutter suppression on the three-frame difference image by dividing the three-frame difference output image by a background image gradient to generate a clutter-suppressed output image for use in identifying a moving target, wherein the reference frame is updated for each subsequent performance of the registering image information, the offsetting pixels and the performing the three-frame difference calculation.

13. A method of target acquisition comprising: registering image information of first and second warped images with image information of a reference image;

offsetting pixels of the warped images based on the outputs of the registering to align the warped images with the reference image;

performing a three-frame difference calculation on the offset images and the reference image to generate a three-frame difference output image;

performing clutter suppression on the three-frame difference image to generate a clutter-suppressed output image for use in identifying a moving target;

delaying a first frame of a selected group of frames by twice a predetermined time to generate a twice-delayed frame;

delaying a second frame of the selected group of frames by the predetermined time to generate the reference frame;

warping, based on navigation data, a third frame of the selected group of frames to generate the first warped image; and warping, based on navigation data, the twice-delayed frame to generate the second warped image.

14. The method of claim 13 wherein the frames are part of a sequence of frames generated by an imager, and wherein the navigation data, comprises first and second navigation data streams and includes position information of the imager, directional information of the imager, and velocity information of the imager, when the imager is moving.

15. The method of claim 14 wherein the image information, of first and second warped images, comprises spatial frequency domain image information of first and second warped images, and wherein the image information of the reference image comprises spatial frequency domain image information of the reference image.

16. The method of claim 14 wherein performing the three-frame difference calculation comprises generating the three-frame difference output image based on the following equation:

$$[abs(D_C-D_B)-abs(D_A)]/2*sign(D_C) \text{ wherein:}$$

$D_A$ is a difference between corresponding pixels in the reference image and the second offset image, $D_B$ is a difference between corresponding pixels in the reference image and the first offset image, and $D_C$ is a difference between corresponding pixels in the first offset image and the second offset image.

17. A moving platform for surveillance comprising:

an imager for generating a frames of video; and a target-tracking system for acquiring and tracking a moving target based on the frames of video, wherein the target-tracking system is configured to:

perform a first registration to align image information of a first warped image with image information of a reference image;

perform a second registration to align image information of a second warped image with the image information of the reference image;

offset pixels of the first warped image based on the output of the first registration to align with corresponding pixels of the reference image to generate a first offset image;

offset pixels of the second warped image based on the output of the second registration to align with corresponding pixels of the reference image to generate a second offset image;

perform a three-frame difference calculation on the first offset image, the second offset image and the reference image to generate a three-frame difference output image; and perform clutter suppression on the three-frame difference image to generate a clutter-suppressed output image.

18. The moving platform of claim 17, wherein the moving platform is an unmanned aerial vehicle (UAV).

19. The moving platform of claim 18 wherein to perform the clutter suppression, the target-tracking system is configured to:

calculate image background by subtracting the three-frame difference output image from the reference image and generate a background image;

perform a gradient operation on the background image to calculate a gradient of the background image; and divide the three-frame difference output image by the gradient to generate the clutter-suppressed output image.

20. The system of claim 19 wherein the target-tracking system is further configured to:

delay a first frame of a selected group of frames by twice a predetermined time to generate a twice-delayed frame;

delay a second frame of the selected group of frames by the predetermined time to generate the reference frame;

warp, based on navigation data, a third frame of the selected group of frames to generate the first warped image; and warp, based on navigation data, the twice-delayed frame to generate the second warped image.

* * * * *

UNITED STATES PATENT AND TRADEMARK OFFICE
CERTIFICATE OF CORRECTION

| | | |
|---|---|---|
| PATENT NO. | : 8,611,600 B2 | Page 1 of 4 |
| APPLICATION NO. | : 13/271700 | |
| DATED | : December 17, 2013 | |
| INVENTOR(S) | : Newman et al. | |

It is certified that error appears in the above-identified patent and that said Letters Patent is hereby corrected as shown below:

The title page showing the illustrative figure should be deleted to be replaced with the attached title page.

The drawing sheets, consisting of Figs. 1 and 7, should be deleted to be replaced with the drawing sheets, consisting of Figs. 1 and 7, as shown on the attached pages.

In the Specification:

In column 1, line 35, delete "(problem" and insert --problem--, therefor

In column 2, line 66, delete "my" and insert --may--, therefor

In column 3, line 29, after "operate", delete "and", therefor

In column 4, line 19, delete "$D_B$-" and insert --$D_B$=--, therefor

In column 4, line 36, delete "sign($D_A$))." and insert --(-sign($D_A$)).--, therefor In column 6, line 16, delete "my" and insert --may--, therefor In column 6, line 56, delete "my" and insert --may--, therefor

In column 7, line 46, delete "aground" and insert --a ground--, therefor In the Claims:

In column 10, line 56, in claim 13, after "registering", insert --image--, therefor In column 11, line 33, in claim 17, after "generating", delete "a", therefor Signed and Sealed this
Twenty-sixth Day of August, 2014

Michelle K. Lee
*Deputy Director of the United States Patent and Trademark Office*

(12) United States Patent
Newman et al.

(10) Patent No.: US 8,611,600 B2
(45) Date of Patent: Dec. 17, 2013

(54) THREE-FRAME DIFFERENCE MOVING TARGET ACQUISITION SYSTEM AND METHOD FOR TARGET TRACK IDENTIFICATION

(75) Inventors: Arthur M. Newman, Sherman Oaks, CA (US); Vitaliy M. Kaganovich, Los Angeles, CA (US); Nicholas Sun, Cerritos, CA (US); Dave S. Douglas, Marina Del Ray, CA (US)

(73) Assignee: Raytheon Company, Waltham, MA (US)

(*) Notice: Subject to any disclaimer, the term of this patent is extended or adjusted under 35 U.S.C. 154(b) by 125 days.

(21) Appl. No.: 13/271,700

(22) Filed: Oct. 12, 2011

(65) Prior Publication Data
US 2013/0094694 A1 Apr. 18, 2013

(51) Int. Cl.
G06K 9/00 (2006.01)
H04N 5/225 (2006.01)

(52) U.S. Cl.
USPC .................................. 382/103; 348/169

(58) Field of Classification Search
USPC .......... 382/103, 107, 236; 348/152, 154, 155, 348/169, 170, 171, 172, 208.14, 208.16, 348/352, 353, 356, 465, 558, 208.1, 208.2; 715/250, 862
See application file for complete search history.

(56) References Cited

U.S. PATENT DOCUMENTS

| 5,150,426 | A  | * | 9/1992 | Banh et al. | 382/103 |
| 5,960,097 | A  | * | 9/1999 | Pfeiffer et al. | 382/103 |
| 7,483,551 | B2 | * | 1/2009 | Chen | 382/107 |
| 7,933,464 | B2 | * | 4/2011 | Zhang et al. | 382/255 |

OTHER PUBLICATIONS

"Israel Application Serial No. 218825, Voluntary Amendment filed Jul 3, 2012", 7 pgs.

* cited by examiner

Primary Examiner — Abolfazl Tabatabai
(74) Attorney, Agent, or Firm — Schwegman, Lundberg & Woessner (57) ABSTRACT

Embodiments of a target-tracking system and method of determining an initial target track in a high-clutter environment are generally described herein. The target-tracking system may register image information of first and second warped images with image information of a reference image. Pixels of the warped images may be offset based on the outputs of the registration to align each warped images with the reference image. A three-frame difference calculation may be performed on the offset images and the reference image to generate a three-frame difference output image. Clutter suppression may be performed on the three-frame difference image to generate a clutter-suppressed output image for use in target-track identification. The clutter suppression may include performing a gradient operation on a background image to remove any gradient objects.

20 Claims, 7 Drawing Sheets

*FIG. 1*

FIG. 7